INVENTORS.
HERMAN G. KLEMM &
ALEXANDER H. MARK
BY

ATTORNEYS.

Feb. 25, 1964     H. G. KLEMM ET AL     3,122,144
THRESHING CYLINDER CONSTRUCTION
Filed March 13, 1961     2 Sheets-Sheet 2
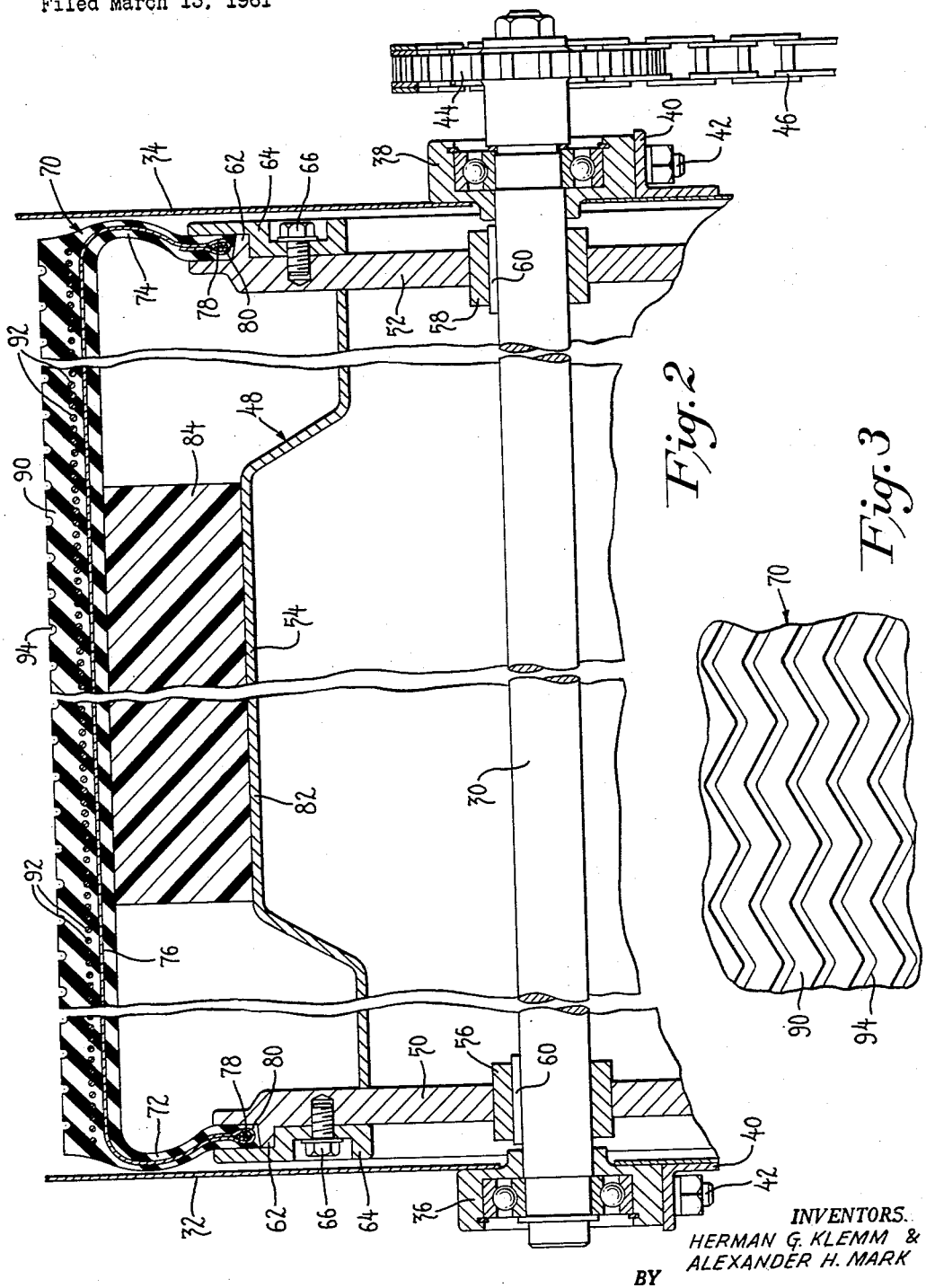
INVENTORS.
HERMAN G. KLEMM &
ALEXANDER H. MARK
BY
ATTORNEYS.

United States Patent Office 3,122,144
Patented Feb. 25, 1964

3,122,144
THRESHING CYLINDER CONSTRUCTION
Herman G. Klemm, Birmingham, and Alexander H. Mark, Livonia, Mich., assignors to Massey-Ferguson Limited, Toronto, Ontario, Canada, a corporation of Canada
Filed Mar. 13, 1961, Ser. No. 95,377
1 Claim. (Cl. 130—27)

This invention relates to threshing machines, combines and like equipment and more particularly to the threshing cylinder used with such equipment.

Heretofore the threshing or separator cylinder used to separate grain, beans and like farm crops from the growing stock has usually been either of a circumferentially spaced rasp bar construction or utilize radially extending spike teeth. Unfortunately, certain farm crops such as beans and peas are prone to cracking when harvested with such equipment with an ensuing loss in revenue to the farm operators.

Cylinder constructions of these types are also subject to being damaged by the entry of foreign material such as stones or scrap metal with the harvested crop and when such damage occurs costly and time-consuming delays ensue just when the farmer is needing to get his crop harvested at proper ripeness and moisture content.

It has been proposed to overcome such difficulties by the provision of a threshing cylinder made of rubber or covered with rubber as for example in the patent to Maginn 2,265,380 but such constructions have not proven satisfactory because the solid rubber portions which contact the crop, and any foreign material, are not sufficiently yielding, particularly with easily cracked crops, and they function very similarly to metal cylinders It is an object of this invention to provide a new and different form of threshing cylinder and one which is less injurious of the farm crop being harvested. Such a cylinder is of a resilient construction and includes numerous features assuring efficient operation, long serviceable lift, and due protection of the crop being harvested. It is sufficiently simple in construction, readily installed and easily serviced to provide numerous advantages over other forms of threshing cylinders without the commonly known disadvantages thereof.

More specifically it is an object to provide an improved cylinder construction utilizing a rubber-like surface for contacting the crops and which provides a readily yieldable cylindrical wall supported against inward deflection merely by fluid pressure together with a resilient body of cushioning material internally of the cylinder.

It is also an object to provide an improved cylinder construction utilizing an inflated rubber-like bag or tire in which the rubber-like portions may provide a true cylindrical wall of long axial dimension compared to its diameter and which provides more uniform yieldability over its entire surface with ease of mounting upon a driven axle arrangement, good sealing and with precise limitations of radial expansion uniformly along its full length.

It is also an object to provide a threshing device comprising a concave grate and a yielding walled cylinder which will take less power per unit of concave area to perform a given amount of threshing.

A further object is to provide such a threshing mechanism which can be operated at higher speeds, with longer arcs of contact between the cylinder and the concave and which can handle more crops per unit of time than previously known threshing mechanism of equal size.

Another object is to provide a threshing mechanism which will reduce the number of times each kernel is contacted by the cylinder, that is to reduce the likelihood of rebounding of the kernels against the cylinder and thus reduce the possibility of cracking or otherwise damaging the grain.

A further object is to provide a threshing cylinder and concave construction which is less sensitive to non-uniformly distributed crops at entry, that is, where the incoming crop is of varying density along the length of the cylinder.

A further object is to provide a threshing mechanism which will be well adapted to threshing all varieties of crops from small seeds to beans and corn with good efficiency.

The numerous advantages obtained in the use of this particular threshing cylinder, and the novel features thereof, will be best understood and appreciated upon a reading of the following specification and upon a study of the appended drawings wherein:

FIGURE 2 is an enlarged cross-sectional view of the threshing cylinder of this invention, axially therethrough, as seen on the plane of line 2—2 of FIGURE 1 and looking in the general direction of the arrows thereon.

FIGURE 3 is an enlarged and fragmentary view of the peripheral surface of the threshing cylinder of this invention as seen in the plane of line 3—3 of FIGURE 1, looking in the general direction of the arrows thereon.

Figure 1:
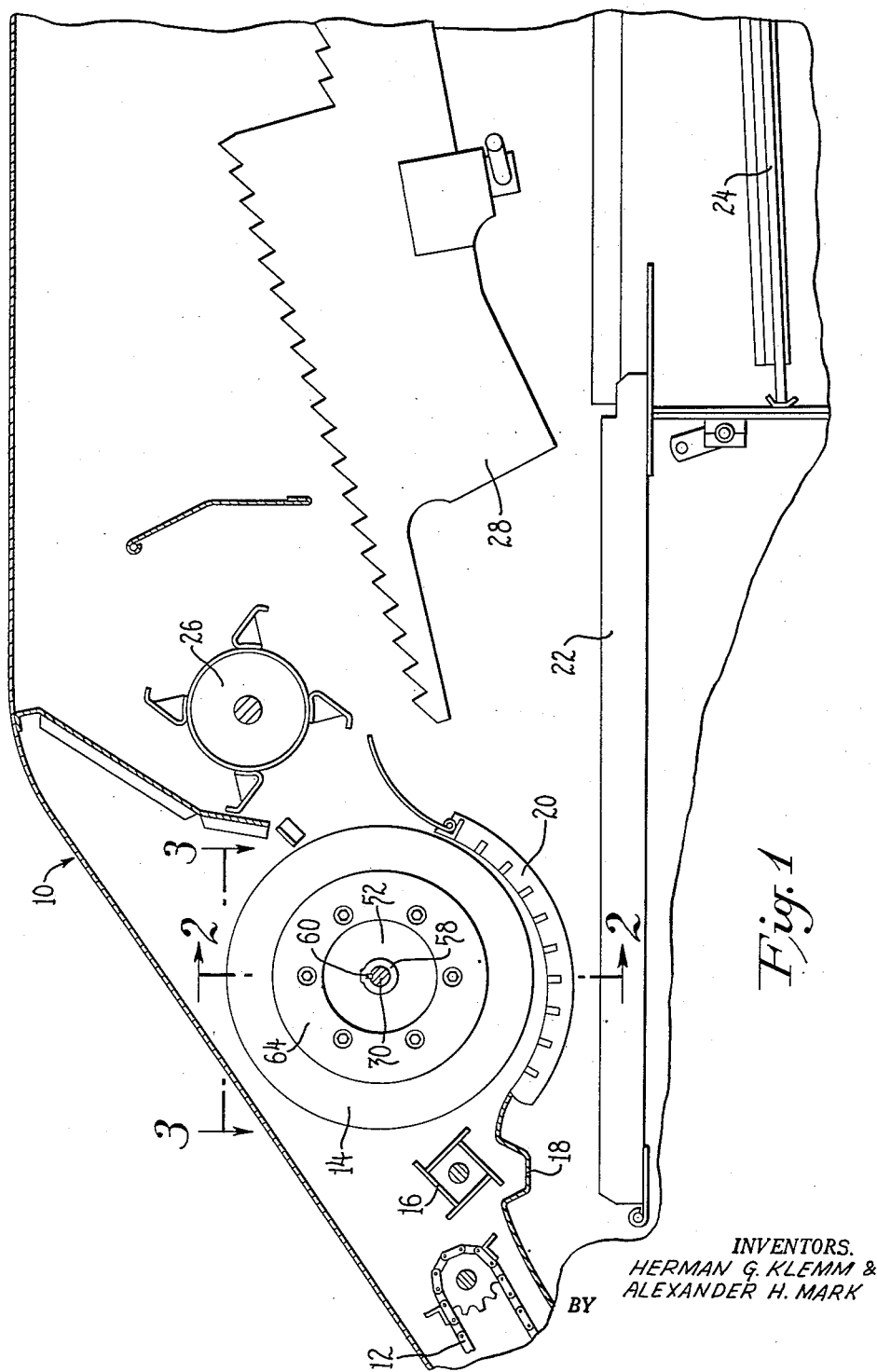
FIGURE 1 is a cross-sectional plan view of the internal mechanism of a threshing machine showing the threshing cylinder of this invention and the disposition of operatively associated parts thereof.

The commonly known threshing machine for harvesting farm crops is shown by FIGURE 1. The machine 10 includes an endless chain driven floating elevator 12 for carrying the harvested crops to the threshing cylinder 14. A suitably mounted stripper beater 16 is interposed between the end of the floating elevator 12 and threshing cylinder 14 to guide the crop against the guide pan 18 and between the threshing cylinder and the grate concave 20.

The threshing cylinder 14 is provided and is formed and mated with the grate concave 20 to move the crop over the open bar mesh of the grate and effect threshing and separation of the grain or other farm crop from the chaff, straw, vines, stalks and other material. A grain pan 22 is provided under the grate concave 20 and leads to a chaffer sieve 24 where the grain and chaff are separated.

The material which leaves the concave is next fed under a drum beater 26 where it is evened out and fed on to the straw walkers 28. Any of the crop not separated out by the threshing cylinder 14 or drum beater 26 is shaken free on the straw walkers and falls through to the grain pan 22 and chaffer sieve 24.

The particular threshing cylinder 14 of this invention is shown in greater detail by the remaining figures of the drawings.

The threshing cylinder 14 includes a supporting shaft 30 extending through the side walls 32 and 34 of the threshing machine 10 and journalled within bearings 36 and 38 disposed externally thereof. It will be noted that the bearing members 36 and 38 are retained by suitable flanges 40 and bolt means 42 for ready removal, if required.

The cylinder supporting shaft 30 has a sprocket wheel 44 provided on one end thereof and has the sprocket members engaged with a sprocket chain 46 for operation thereof.

An internal drum 48 is provided on the shaft 30, between the side walls 32 and 34, and includes end wall flanges 50 and 52 bearing a cylindrical part 54 secured therebetween and disposed concentrically about the drive shaft 30. The flanges 50 and 52 each include a hub portion 56 and 58, respectively, received on the shaft 30 and positioned by a key 60 secured to the shaft near each end thereof.

The end wall flanges 50 and 52 of drum 48 are each formed to include an annular ridge 62 on the outer side faces thereof which cooperates with a complementary retainer ring 64, and suitable fastening means 66, to retain an elastic bag or cylinder 70 engaged therewith.

The elastic cylinder 70 includes end walls 72 and 74 held to the drum 48 by the retainer means last mentioned. It is of a rubber or other resilient composition and includes a nylon cord or like fabric casing 76 embedded in the peripheral and end walls thereof. The edges of the fabric casing are wrapped around wire bands 78 within the edges of the end walls 72 and 74 and form the retaining beads 80.

The cylindrical wall 54 of the drum 48 is formed to have a larger diameter intermediate the ends thereof, as at 82, and has an elastomeric or plastic foam sleeve 84, or series of arcuate blocks of like material, provided thereon and engaged with the internal wall of the cylinder 70. This foam sleeve is formed of open-celled foam so that fluid may flow from cell to cell thereof.

It will be appreciated that the member 84 fills the space between the drum 48 and the cylinder 70 and extends substantially between the ends thereof. Accordingly, the rigidity of the outer peripheral wall of the cylinder 70 will be dependent upon its composition and the composition of the backing member 84. Further, the centrifugal force effect in the course of cylinder rotation will also be proportional to the density of the rubber or plastic foam backing member.

The outer wall 90 of the cylinder 70 will be noted to include wire cords 92 embedded therein and provided circumferentially therearound. This provides added rigidity and hoop-strength to the cylinder member.

A tread pattern 94 is provided on the external surface of the outer wall of the cylinder 70 and is inclusive of wavy grooves which extend around the cylinder and provide sufficient traction to carry the crop cuttings across the grate concave 20 without damage to the crop being harvested.

In use the rotation of the cylinder rubs the moving mat of harvested crops against the combine in a manner generally analogous to a conventional thresher. The rubber-like tread pattern engages the crop with a higher friction than metal and assists in pulling and rubbing the crops through and in stripping the kernels or beans from their husks, heads, pods or cobs.

Unlike conventional threshers the cylindrical wall surface is flexible and may be depressed inward if the thickness of crops between cylinder and concave at any point is sufficient. It is yieldably maintained in its normally fully extended position by both air pressure and by centrifugal force. If desired, the air pressure may be dispensed with and centrifugal force alone utilized. In addition to the mass of the cylindrical wall itself and the supporting spokes the mass of any desired amount of liquid may be used. This may be varied as required for a wide range of crops by adding or removing liquid. Thus more or less pressing force may be exerted radially upon the crops as they pass along the concave. The force however, when once established by a given charge in the cylinder, remains substantially constant regardless of the thickness of the crop mat on the concave.

By utilizing this method of rubbing the crops against an uninterrupted flexible wall through which a predetermined force is applied independently of the amount of crop present at any local point it is possible to thresh with less power and at higher rates of through-put. It is also possible to thresh with less damage and with a wider range of crop varieties with a single threshing assembly. Adaptation to different varieties and differing field conditions is relatively simple. The method also greatly reduces slugging and wrapping difficulties and permits a greater arc of embrace of the cylinder by the concave thus adding to the capacity for a given size of cylinder.

We claim as our invention:

In a threshing machine, the combination comprising, a frame, a semi-cylindrical concave mounted on said frame so as to open upwardly, an axle journalled in said frame above said concave, said axle having a rigid core portion, a flexible body surrounding said axle and having a cylindrical center portion and radial side walls sealed peripherally to said core portion, said center portion being pliable and having an axial length at least three times greater than the radial dimension of said side walls, the outer surface of said center portion being smooth with a tread pattern formed therein of lesser depth than the thickness of said center portion, blocks of foamed material interposed between said core portion and said center portion just above said concave, and means for admitting and retaining gas and liquid within said body to add firmness and weight to said body, said foamed block being open celled so that gas or fluid can be distributed axially and peripherally within the body.

References Cited in the file of this patent
UNITED STATES PATENTS

| | | |
|---|---|---|
| 227,886 | Eaton | May 25, 1880 |
| 663,218 | Crippen | Dec. 4, 1900 |
| 1,427,000 | Lewinski | Aug. 22, 1922 |
| 2,265,380 | Maginn | Dec. 9, 1941 |
| 2,607,072 | Johnson | Aug. 19, 1952 |
| 2,610,634 | Beck et al. | Sept. 16, 1952 |